UNITED STATES PATENT OFFICE.

MAX ENGELMANN, OF ELBERFELD, GERMANY, ASSIGNOR TO FARBEN-FABRIKEN OF ELBERFELD CO., OF NEW YORK, N. Y., A CORPORATION OF NEW YORK.

PROCESS OF MAKING DIALKYL BARBITURIC ACID.

SPECIFICATION forming part of Letters Patent No. 789,902, dated May 16, 1905.

Application filed February 28, 1905. Serial No. 247,778.

*To all whom it may concern:*

Be it known that I, MAX ENGELMANN, doctor of philosophy, chemist, residing at Elberfeld, Germany, (assignor to the FARBENFABRIKEN OF ELBERFELD CO., of New York,) have invented a new and useful Improvement in Processes of Preparing Dialkyl Barbituric Acids; and I do hereby declare the following to be an exact and clear description of my invention.

My invention relates to a new process for the production of dialkyl barbituric acids having the following general formula:

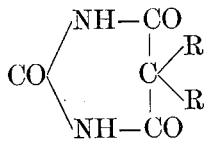

(R meaning an alkyl radical) which bodies possess valuable therapeutic, especially soporific, properties. The process for the preparation of these compounds consists in first condensing dialkyl malonyldiamid of the general formula:

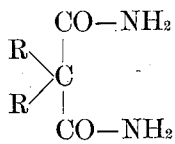

with neutral carbonic esters—such as dimethyl carbonic ester, diethyl carbonic ester, methylethyl carbonic ester, diphenyl carbonic ester, or the like—by means of alkaline condensing agents, and, secondly, isolating the resulting dialkyl trioxypyrimidins (dialkyl barbituric acids) from the reaction mixture.

In order to carry out my process practically, I can, for instance, proceed as follows:

Example 1: Forty-six parts of sodium are dissolved in eight hundred parts of alcohol, and the solution thus obtained is mixed with one hundred and eighteen parts of the diethylic ester of carbonic acid and with one hundred and fifty-eight parts of diethylmalonyldiamid. It is heated for four hours in an autoclave at 120° centigrade. The reaction takes place according to the following equation:

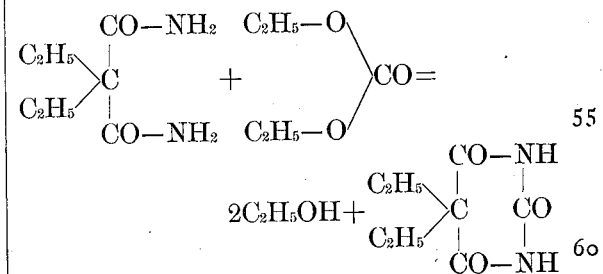

After cooling the sodium salt of the diethyl trioxypyrimidin is filtered off and decomposed by means of dilute acetic acid. By a recrystallization from hot water the free body is obtained in the shape of crystals.

Example 2: One hundred and forty parts of dimethylmalonyldiamid and two hundred and ten parts of diphenyl carbonic ester are added to a solution of forty-six parts of sodium in eight hundred parts of alcohol, and the resulting mixture is heated in an autoclave at 120° centigrade for four hours. After cooling dimethyl barbituric acid is isolated and purified by a recrystallization from water.

Example 3: A mixture of one hundred and eighteen parts of diethyl carbonic ester, one hundred and thirty parts of diethylmalonyldiamid, and one hundred and forty parts of solid sodium ethylate is heated at 120° centigrade for from four to five hours. After cooling the reaction mass is mixed with water and acidulated, by which means the diethyl barbituric acid is precipitated. It is filtered off and recrystallized from water.

Example 4: Forty-six parts of sodium are slowly introduced into a mixture of one hundred and fifty parts of diethyl carbonic ester with one hundred and sixty parts of diethylmalonyldiamid. A violent reaction ensues. After it has ceased the mass is heated for some time at 140° centigrade. It is dissolved in water, and from the resulting solution the diethyl barbituric acid is precipitated by acidulation. It is filtered off and purified by crystallization.

Example 5: A mixture of two hundred and twenty parts of diphenylcarbonic ester, one hundred and ninety parts of dipropylmalonyldiamid, and one thousand parts of sodium amid is heated at 140° centigrade in an oil-bath for from three to four hours. After cooling the melt is dissolved in water and the resulting dipropyl barbituric acid is precipitated by acidulation. It is filtered off and recrystallized from water.

The process proceeds in an analogous manner for the production of the other dialkyl barbituric acids.

Having now described my invention and in what manner the same is to be performed, what I claim as new, and desire to secure by Letters Patent, is—

1. The process for the production of dialkyl barbituric acids having the above-given general formula, which process consists in first condensing dialkylmalonyldiamid with neutral carbonic esters by means of alkaline condensing agents and secondly isolating the resulting 5-dialkyl-2.4.6-trioxypyrimidins, substantially as hereinbefore described.

2. The process for the production of diethyl barbituric acid, which process consists in first condensing diethylmalonyldiamid with neutral carbonic esters by means of alkaline condensing agents and secondly isolating the resulting 5-diethyl-2.4.6-trioxypyrimidin, substantially as hereinbefore described.

3. The process for the production of diethyl barbituric acid, which process consists in first condensing diethylmalonyldiamid with neutral carbonic esters by means of alkaline alcoholates and secondly isolating the resulting 5-diethyl-2.4.6-trioxypyrimidin, substantially as hereinbefore described.

4. The process for the production of diethyl barbituric acid, which process consists in first condensing diethylmalonyldiamid with diethyl carbonic ester by means of sodium ethylate and secondly isolating the resulting 5-diethyl-2.4.6-trioxypyrimidin, substantially as hereinbefore described.

In testimony whereof I have signed my name in the presence of two subscribing witnesses.

MAX ENGELMANN.

Witnesses:
OTTO KÖNIG,
PAUL HODEIGE.